United States Patent [19]

Harm et al.

[11] Patent Number: 5,214,370

[45] Date of Patent: May 25, 1993

[54] BATTERY CHARGER WITH THERMAL RUNAWAY PROTECTION

[75] Inventors: Charles E. Harm, Dallas City; Kenneth J. Timm, Rockwall, both of Tex.

[73] Assignee: AT&T Bell Laboratories, Murray Hill, N.J.

[21] Appl. No.: 759,357

[22] Filed: Sep. 13, 1991

[51] Int. Cl.⁵ .............................................. H02J 7/04
[52] U.S. Cl. ......................................... 320/35; 320/32
[58] Field of Search ....................... 320/35, 30, 31, 32, 320/36

[56] References Cited

U.S. PATENT DOCUMENTS

| | | | |
|---|---|---|---|
| 3,852,652 | 12/1974 | Jasinski | 320/35 |
| 3,895,283 | 7/1975 | Peterson | 320/35 |
| 4,209,736 | 6/1980 | Reidenbach | 320/22 |
| 5,012,176 | 4/1991 | LaForge | 320/31 |

OTHER PUBLICATIONS

"Battery Monitor Stops Thermal Runaway Cold", by J. Plunkett *Telephony*, vol. 195, No. 16, p. 45.
*Hewlett-Packard Power Supply Catalog*, 1990/91, p. 123, Cited for showing adjustable voltage source in power supply regulation lense lead.

*Primary Examiner*—Steven L. Stephan
*Assistant Examiner*—Matthew Nguyen
*Attorney, Agent, or Firm*—Alfred G. Steinmetz

[57] ABSTRACT

A battery charger control includes a thermal sensor attached to the battery being charged. If the temperature readings indicate a thermal runaway condition the charging current output is adjusted in accord with the temperature reading by means of voltage injeciton into an output sense lead of the charging circuitry as a means of achieving a control that prevents thermal runaway of the battery while still permitting continuous charging of the battery.

4 Claims, 3 Drawing Sheets

005,214,370

BATTERY CHARGER WITH THERMAL RUNAWAY PROTECTION

FIELD OF THE INVENTION

This invention relates to controlling the charging of batteries and in particular to the prevention of thermal runaway during battery charging.

BACKGROUND OF THE INVENTION

Potential thermal runaway is a critical concern in the charging of valve regulated lead acid storage batteries. Such thermal runaway conditions have lead to fires and explosions due to the reactions of the batteries. This condition is often aggravated by the high ambient temperature conditions in which the battery charging process is forced to operate. The damage due to thermal runaway is often expensive and service depending on the battery power is often disrupted.

This thermal runaway problem has been previously manually controlled with respect to the battery plants located in central offices of telephone systems. Thermal runaway is mainly prevented by continuous manual supervision alert to the occurrence of this thermal runaway possibility in order to enable supervisoyr personal monitoring the battery conditions to take immediate preventative action.

An automatic scheme for preventing thermal runaway is disclosed in *Telephony*, Oct. 16, 1978, in an article by Jim Plunkett entitled "Battery Monitor Stops Thermal Runaway Cold". In this scheme the battery temperature and charging voltage is monitored by a monitoring device. If either the charging voltage or battery temperature exceeds a preset limit, the application of charging current to the battery is interrupted. This unfortunately terminates the battery charging until conditions improve. It may be desirable to continue charging if it can be performed safely.

SUMMARY OF THE INVENTION

A battery charger control includes a thermal sensor attached to the battery being charged. If the temperature readings indicate a thermal runaway condition, the charging current output is adjusted in accord with the temperature reading by means of voltage injection into an output sense lead of the charging circuitry as a means of achieving a continuous control that prevents thermal runaway of the battery while still permitting continuous charging of the battery.

DETAILED DESCRIPTION

Figure 1:
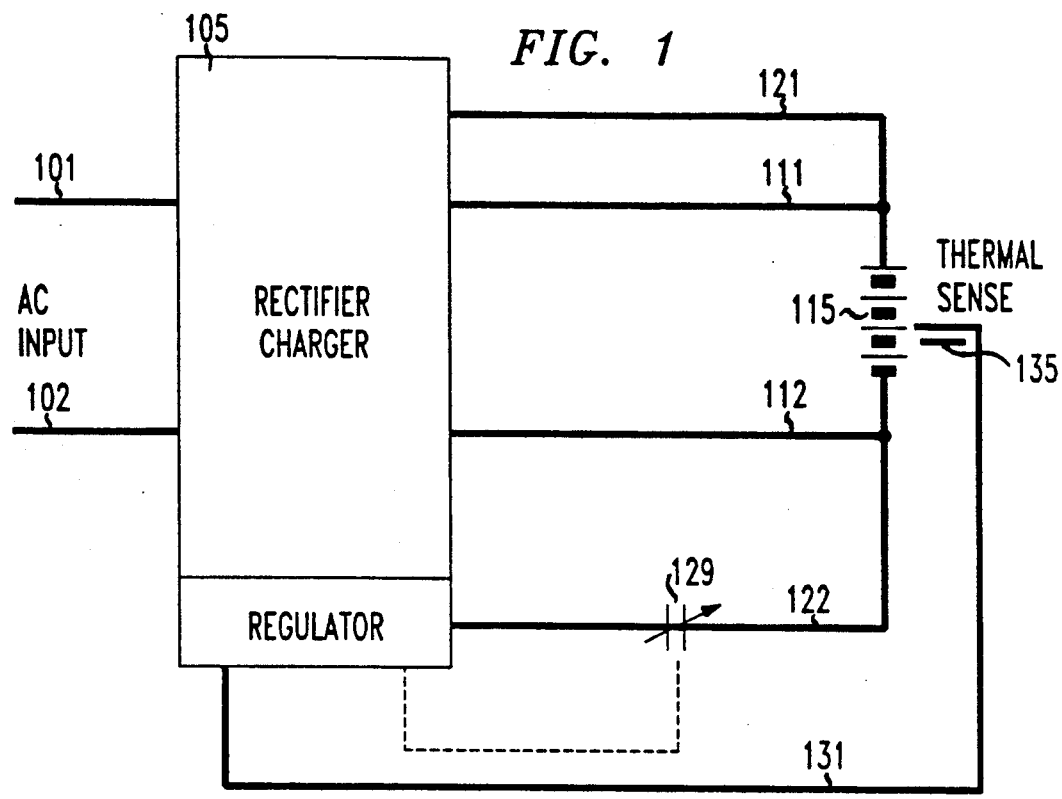
FIG. 1 is a block diagram of a rectifier charger of a battery embodying thermal runaway protection according to the principles of the invention.

A controlled rectifier battery charger is shown in block schematic from in FIG. 1. Power from an AC power line is applied to the input leads 101 and 102 of the rectifier charger 105. The rectifier charger 105 includes a rectifier to rectify the input AC voltage, voltage control circuitry which may include a ferro transformer or a power switching circuit, and regulation control circuitry responsive to a sensed charging voltage and battery temperature to control the output of the voltage control circuitry. The output of the rectifier charger is applied, via leads 111 and 112, to charge a battery load 115. The battery load may be a single battery, a string of battery cells or a battery plant. In the illustrative embodiment the battery load includes valve regulated lead acid storage batteries, a battery type dreadfully prone to thermal runaway during charging.

Sensing leads 121 and 122, operative to sense the voltage across the terminals of the charging batteries 115, connect the rectifier charger 105 to the battery. A thermal sensor 135 is physically coupled to the battery or battiers 115 in order to sense its temperature. It returns a signal, via lead 131, to ther egulation control circuitry of the rectifier charger. This thermal sensor may comprise a thermistor or thermocouple or similar temperature responsive device attached to the battery case or to its terminals which are used to sense the charging voltage.

An adjustable voltage source 129 is included within the path of sense lead 122. Its voltage magnitude is responsive to the regulation control circuitry of the rectifier charger, which in turn is responsive to the sensed temperature, and is varied in response to the sensed temperature conditions of the battery to adjust the charging ccurrent in order to prevent thermal runaway. In this arrangement the charging output of the rectifier charger 105 is adjusted in accordance with the sensed temperature by means of controlled voltage injection into a charging voltage sensing lead. As the temperature of the charging batteries increases, the output charge of the rectifier charger is proportionately decreased to prevent thermal runaway.

Figure 2:
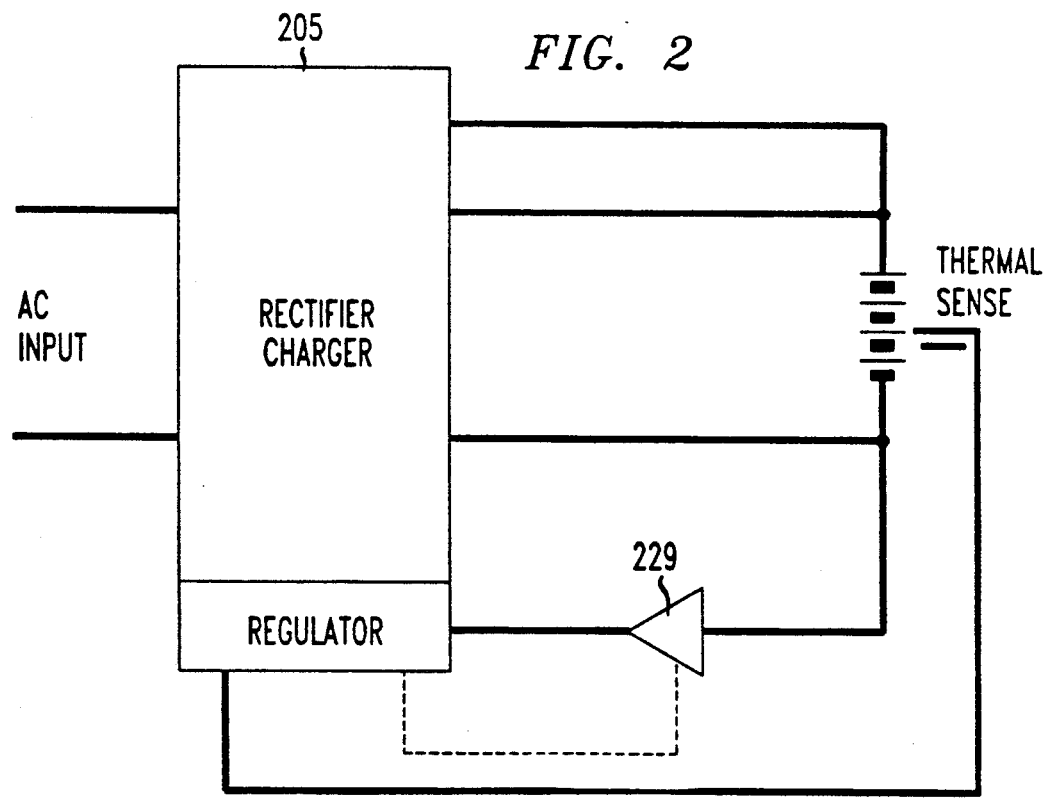
FIG. 2 is a block diagram of a rectifier charger of a battery having another embodiment providing thermal runaway protection according to the principles of the invention.

The charging apparatus of FIG. 2 is similar to that of the apparatus of FIG. 1 except the conceptual adjustable voltage source of FIG. 1 is replaced with electronic voltage injection circuitry 229. This circuitry is operative in conjunction with ther egulation control of the rectifier charger 205 to adjust the charging voltage in response to the temperature of the changing batteries to prevent thermal runaway. This electronic injection or battery thermal regulator circuitry is shown in detail in FIG. 3.

Figure 3:
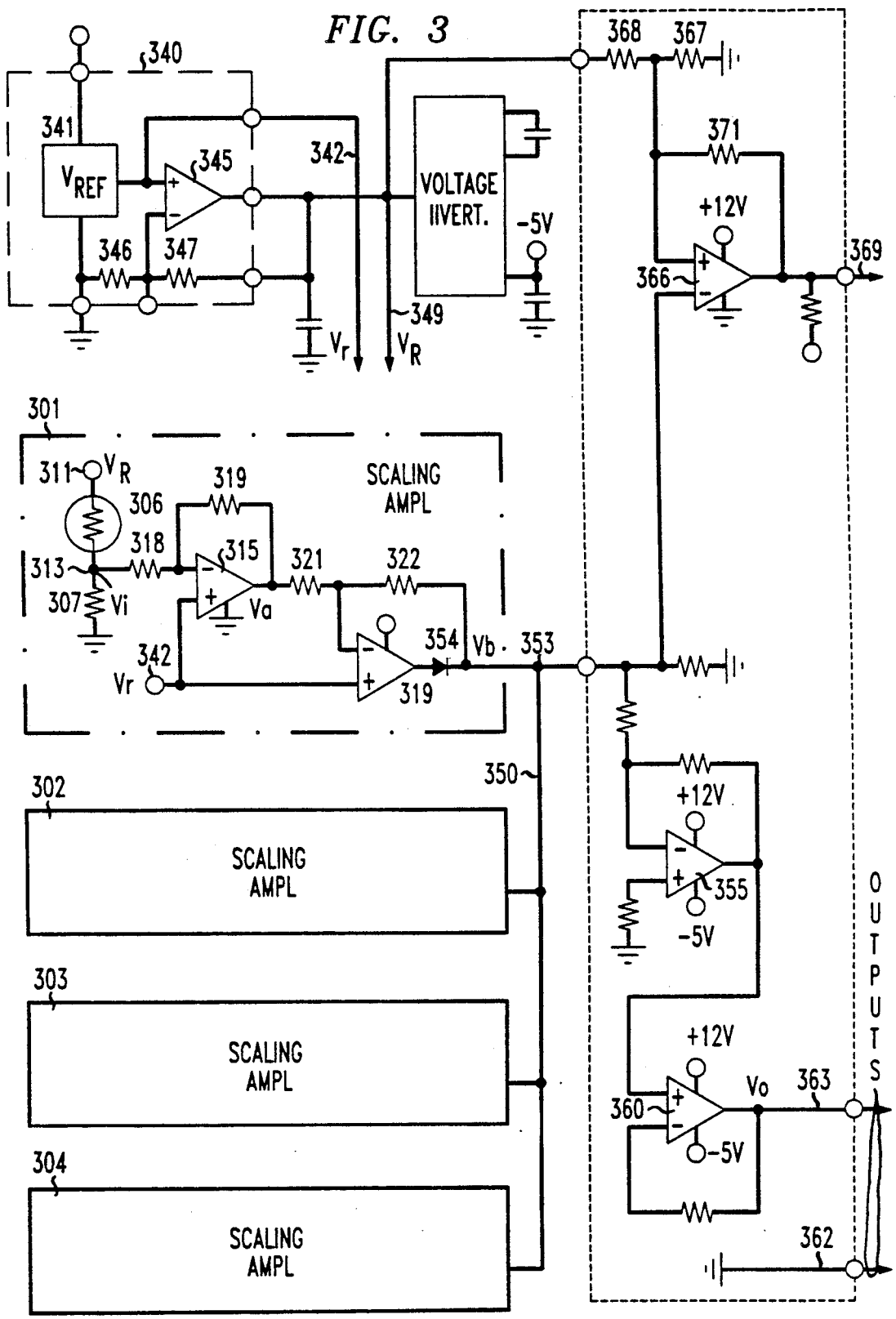
FIG. 3 is a circuit schematic of a battery thermal regulator circuit embodying the principles of the invention.

The battery thermal regulator circuitry of FIG. 3 includes a plurality of thermal sensing circuits 301-304 which are connected to sense the temperature of the battery plant at selected strategic locations. Each thermal sensing circuit 301-304 is substantially identical in design and hence only the circuitry of the thermal sensing circuit 301 is shown and discussed in detail.

A terhmistor device 306, which is connected in physical contact with a temperature sensitive part of the battery plant, is electrically connected in series with a resistor 307 to form a voltage divider. The voltage divider is powered by a reference voltage $V_R$, at lead 311, as supplied by the reference voltage source 340 on lead 349. The voltage $V_i$ at node 313 is proportional to the temperature of the battery at the sensor's physical location. This voltage $V_i$ is applied to the inverting input of a scaling amplifier 315 having a gain determined by the resistor pair including the resistors 318 and 319. A reference voltage $V_r$, supplied by the reference voltage source on lead 342, is applied to the non-inverting input of the scaling amplifier 315.

An output $V_a$, of the scaling amplifier 315 is applied to an inverting input of an inverting amplifier 319. Its gain is determined by the resistors 321 and 322. A reference voltage $V_r$ is applied to its non-inverting input. Its output $V_b$ is applied to the bus 350 common to the outputs of all the battery thermal regulator circuits 301-304.

The reference voltages are supplied by the voltage reference source 340 which includes a band gap reference 341 which supplies the reference voltage $V_r$ at lead 342. The band gap reference voltage is also applied to the amplifier 345 whose gain, as defined by resistors 346 and 347, produces a second reference voltage $V_R$, on lead 349, which is greater in magnitude than reference voltage $V_r$.

The voltage output $V_b$ of the battery thermal regulator circuits 301-304 is applied, via ORing diodes 354 and the bus 350, to a node 353. The voltage of 353 represents the highest voltage of the multiple battery thermal regulator circuits 301-304 which particular voltage represents the most critical monitored temperature. This voltage is applied to a unity gain inverter 355 whose output in turn is applied to a low impedance voltage follower amplifier 360. Both the unity gain inverter 355 and low impedance voltage follower 360 are energized by a voltage extending between positive and negative values to ensure that the output $V_0$ on led 363 will encompass zero as well as negative voltage values. The voltage between output leads 363 and grounded lead 362 is applied in series with the charging voltage sense lead such as is shown in FIGS. 1 and 2. The highest sensed temperature controls this injeciton voltage and hence the onset of thermal runaway is reliably contained.

The voltage of node 353 is also applied to the inverting input of a comparator 366. The reference voltage $V_R$, as divided by a voltage divider comprising the resistors 367 and 368, is applied to its non-inverting input. The output of the comparator on lead 369 is a battery temperature status signal and as such is applied to system monitoring equipment. The resistor 371 is added to provide hysteresis and provide the comparator with crisp state changes.

Figure 4:
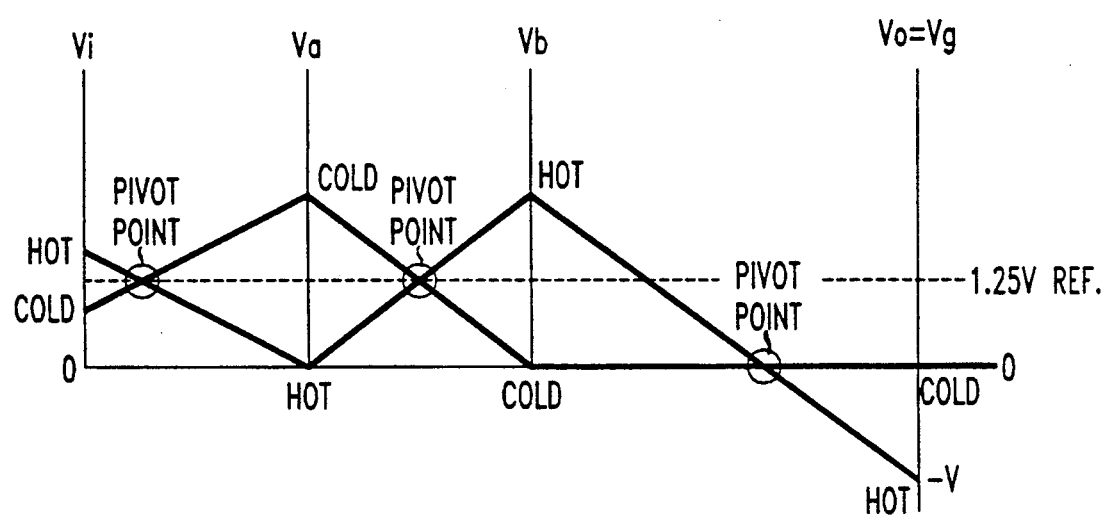
FIG. 4 is a graphical representation of control system voltage responsive to thermistor temperatures.

A diagram depicting the various voltage states of the battery thermal regulator circuit is shown in the FIG. 4. When the battery is below the threshold temeprature value (i.e. cold) $V_i$ is in a low state, $V_a$ is in a high state, $V_b$ is in a low state and the output voltage $V_o$ injected into the sense leads is zero. In contrast when the battery exceeds the threshold temperature the voltage $V_i$ is in a high state, $V_a$ is in a low state, $V_b$ is in a high state and the output voltage $V_o$, injected into the sense lead, is at a negative value determined by the magnitude of the temperature above the threshold value.

We claim:

1. A battery charging circuit comprising:
   a power input for accepting an AC energy source;
   a power output connected to a battery to be charged and supplying the regulated voltage to the battery; and
   a rectifier charging circuit for supplying current at the regulated voltage to the power output, and including a regulation control for controlling teh voltage;
   a temperature sensing device located proximate to the battery;
   scaling circuitry for converting a value of the temperature sensing device to a voltage magnitude;
   a voltage output of the scaling circuitry connected to the regulation control;
   wherein the improvement comprises:
   voltage sensing leads connected to terminals of the battery being charged and to the rectifier charging circuit;
   circuitry included in series with one of the voltage sensing leads for injecting a voltage into a path of the voltage sensing leads;
   whereby the voltage injected into the path of the voltage sensing leads alters the charging voltage supplied by the rectifier charging circuit to the battery to compensate for a temperature sensed by the temperature sensing device.

2. A battery charging circuit as claimed in claim 1;
   wherein the improvement further comprises:
   the circuitry for injecting a voltage comprises amplifier circuitry having an output coupled to inject a voltage into series with the path of the voltage sensing leads.

3. A battery charging circuit as claimed in claim 2;
   wherein the improvement further comprises:
   the temperature sensing device includes a thermistor physically located proximate to the battery.

4. A battery charging circuit as claimed in cliam 3;
   wherein the improvement further comprises:
   the thermistor being connected in series with a resistor to form a voltage divider, and
   the scaling circuitry includes an amplifier responsive to a divided voltage output of the voltage divider.

* * * * *